United States Patent

[11] 3,554,508

[72] Inventor David E. Dell'Agnese
  Port Washington, Wis.
[21] Appl. No. 804,546
[22] Filed Mar. 5, 1969
[45] Patented Jan. 12, 1971
[73] Assignee Modern Equipment Company
  Port Washington, Wis.
  a corporation of Wisconsin

[54] SCRAP METAL PREHEATERS
  19 Claims, 5 Drawing Figs.
[52] U.S. Cl. ................................................ 263/15,
  263/2
[51] Int. Cl. ............................................. F27b 17/00
[50] Field of Search ........................................... 263/15, 17,
  2

[56] References Cited
  UNITED STATES PATENTS
1,844,604 2/1932 Schwab .......................... 263/2

2,619,341 11/1952 Wallerius ..................... 263/15
3,379,424 4/1968 Dell'Agnese ................. 263/7
3,379,425 4/1968 Dell'Agnese ................. 263/17

Primary Examiner—John J. Camby
Attorney—Morsell & Morsell

ABSTRACT: A preheater apparatus including a combustion chamber with a blower air annulus and a concentric exhaust gas annulus and communicating exhaust duct, a charge bucket positionable beneath said chamber having an annular cavity with vertical tubes therein communicating with said combustion chamber exhaust gas annulus, ejector means for drawing the exhaust gases upwardly into said tubes, an opening through which air is drawn into said tubes to cool said gases as they flow upwardly into said combustion chamber exhaust gas annulus and out through said exhaust duct, and a combustion air blower adapted to direct air into and through said blower air annulus to the burners, said air cooling the combustion chamber wall and also being preheated thereby to promote maximum burner efficiency.

INVENTOR
DAVID E. DELL'AGNESE

BY
Morsell & Morsell
ATTORNEYS

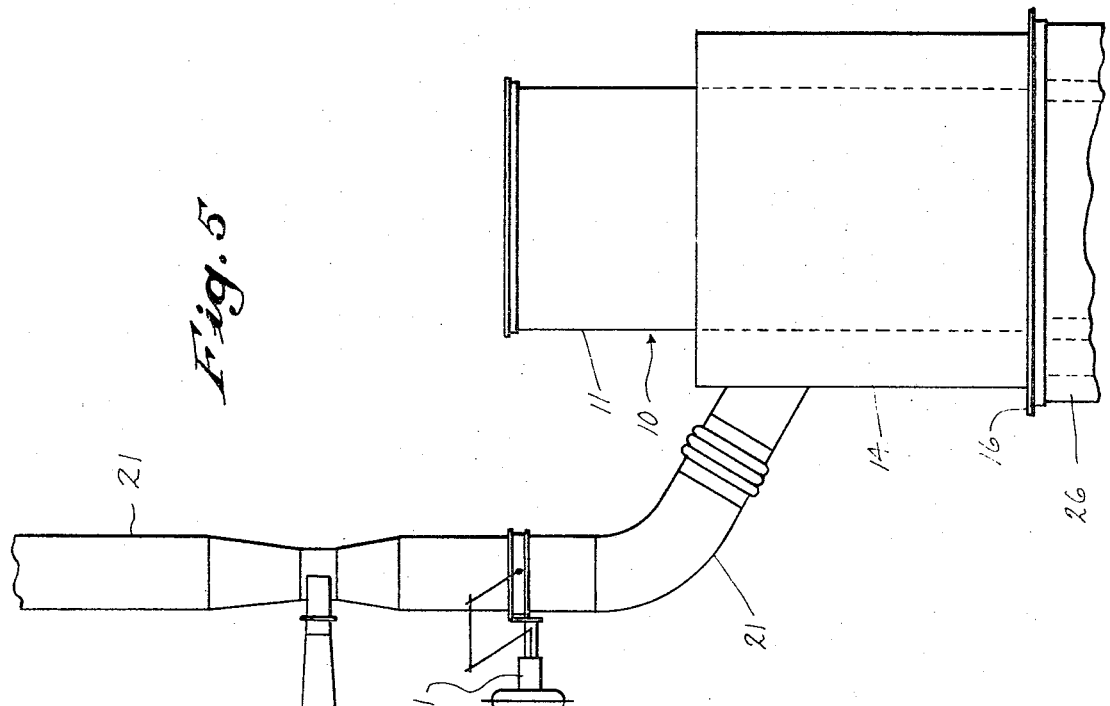
Fig. 5
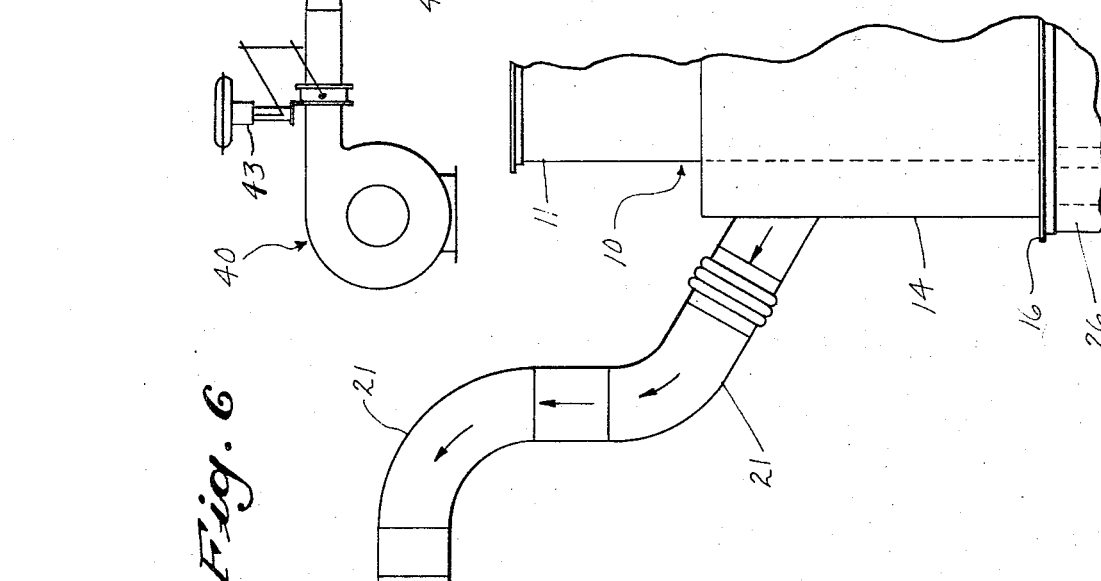
Fig. 6
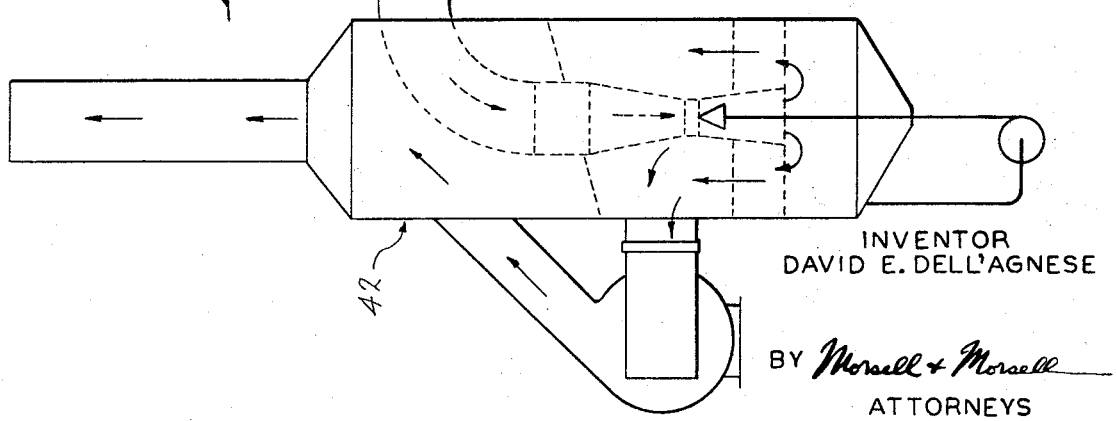
INVENTOR
DAVID E. DELL'AGNESE
BY Morsell & Morsell
ATTORNEYS

SCRAP METAL PREHEATERS

BACKGROUND OF THE INVENTION

1. Field of the Invention

The present invention relates to gas-fired preheaters of the type used for preheating scrap metal before said scrap is fed into an electric melting furnace.

2. Description of the Prior Art

Gas preheaters of the general type herein concerned have long been used to partially heat scrap metal before said scrap is introduced into an electric melting furnace because the preheating of the cold scrap by means of gas provides a substantial cost saving in comparison to performing the entire melting operation in an electric furnace. In addition, the work of the relatively expensive electric furnace is not only reduced, but the volume of scrap that the furnace can process in a given period is also greatly increased. A problem attendant with the use of conventional gas preheaters, however, is that the combustion gases exhausted from the system reach relatively high temperatures which cause rapid deterioration of the preheater and exhaust equipment, thus necessitating the frequent repair or replacement of said equipment.

By way of example, in a typical gas preheating system if the particular melting operation calls for a preheater combustion chamber temperature of about 1,600°, the cold scrap charge initially absorbs most of the heat from the combustion gases passing therethrough with the result that the exhausted gases in the first stages of the heating cycle are at a relatively low temperature which can be easily tolerated by the preheater and exhaust equipment, as well as by any gas scrubbing or cleaning equipment associated therewith. As the temperature of the scrap charge rises, however, less heat is transferred thereto from the combustion gases, of course, and the temperature of the exhausted gases increases progressively. Toward the end of the heating cycle the exhaust gas temperature may exceed 1,000°, which is higher than can be tolerated by the equipment without damage.

One of the principal objectives of the present invention, as mentioned, is to provide means for cooling the exhaust combustion gases to a temperature that is not damaging to the preheater and exhaust components, thereby eliminating the necessity for frequently replacing said equipment.

Examples of prior gas-fired scrap metal preheaters of the general type herein concerned are disclosed in the following U.S. Pat. Nos. 3,379,425; 3,379,424; 3,163,520; 3,172,648; and 471,672.

SUMMARY OF THE INVENTION

The present invention comprises a novel and improved gas-fired scrap metal preheater having a unique vertically shiftable, open bottom combustion chamber unit which is provided with an integral exhaust gas annulus also opening in the lower end thereof and communicating with an exhaust duct extending laterally outwardly from said combustion unit. A specially designed scrap metal charge bucket having an open top and hinged bottom gates is positionable in vertical alignment beneath said combustion chamber when the latter is in a raised position, and is adapted to be sealingly engaged against the underside of said chamber when the latter is shifted to its lowered position. Said charge bucket is provided with an integral annular cavity within which there is mounted a plurality of vertical riser tubes which communicate with said combustion chamber exhaust gas annulus. Suction creating means are mounted in association with the exhaust system, and in the operation of the preheater the hot combustion gases which pass downwardly through the scrap metal charge in the bucket are drawn upwardly through said riser tubes and out through said combustion chamber annulus and communicating exhaust duct. In addition, an annular opening is provided adjacent the bottom of said charge bucket through which outside air is simultaneously drawn into said riser tubes to mix with and cool said combustion gases to a degree where they won't damage or destroy the exhaust or gas cleaning equipment, as well as the bucket and preheater components, thereby substantially increasing the useful life of said equipment.

A further object of the invention is to provide a novel compact preheater assembly wherein the combustion chamber is provided with a second, concentric annular cavity or annulus through which air is directed from an adjacent blower to supply the necessary combustion air to the burners, said blower air functioning to cool the inner wall of the combustion chamber, and thereby eliminating the necessity for relatively expensive refractory lining therein, as well as being preheated in said annulus to provide hotter, more efficient firing of the burners.

A further object of the present invention is to provide a new and improved scrap metal preheater as described wherein the scrap charge can be preheated to a higher temperature than is practical with conventional gas preheaters, because the exhaust gases are prevented from reaching dangerously high temperatures, thereby further facilitating the job of the electric arc or induction furnace.

A further object of the present invention is to provide a new and improved preheater apparatus which is preferably provided with low, medium, and high fire settings which can be varied independently according to the process requirements as well as the quality and density of the scrap, and wherein after each complete heating cycle the burners automatically switch to low fire to permit the withdrawal and replacement of the charge bucket without deactivating the heater.

A further object of the invention is to provide a new and improved gas preheater unit wherein the burner settings and firing sequences can be programmed for automatic operation.

A further object is to provide a new and improved preheater apparatus as described wherein the exhaust means can include a remote venturi-type ejector unit which is better adapted to withstand high temperatures than conventional fans such as are utilized with prior gas preheaters.

Still further objects of the present invention are to provide a new and improved gas-fired scrap metal preheater apparatus characterized by a compact design that requires relatively little valuable floor space, which apparatus is rugged and durable in construction, which is simple and efficient in operation, and which apparatus is otherwise particularly well adapted for its intended purposes.

BRIEF DESCRIPTION OF THE DRAWINGS

In the accompanying drawings, wherein there is illustrated one preferred embodiment of the present invention, and wherein the same reference numerals designate the same parts in both of the views:

FIG. 5 is a simplified partial side elevational view of a preheater showing one form of suction crating means that can be incorporated in the exhaust system; and FIG. 6 is a simplified partial side elevational view showing a preheater within the scope of the present invention operatively associated with an exhaust gas cleaning apparatus.

DESCRIPTION OF THE PREFERRED EMBODIMENT

Figure 1:
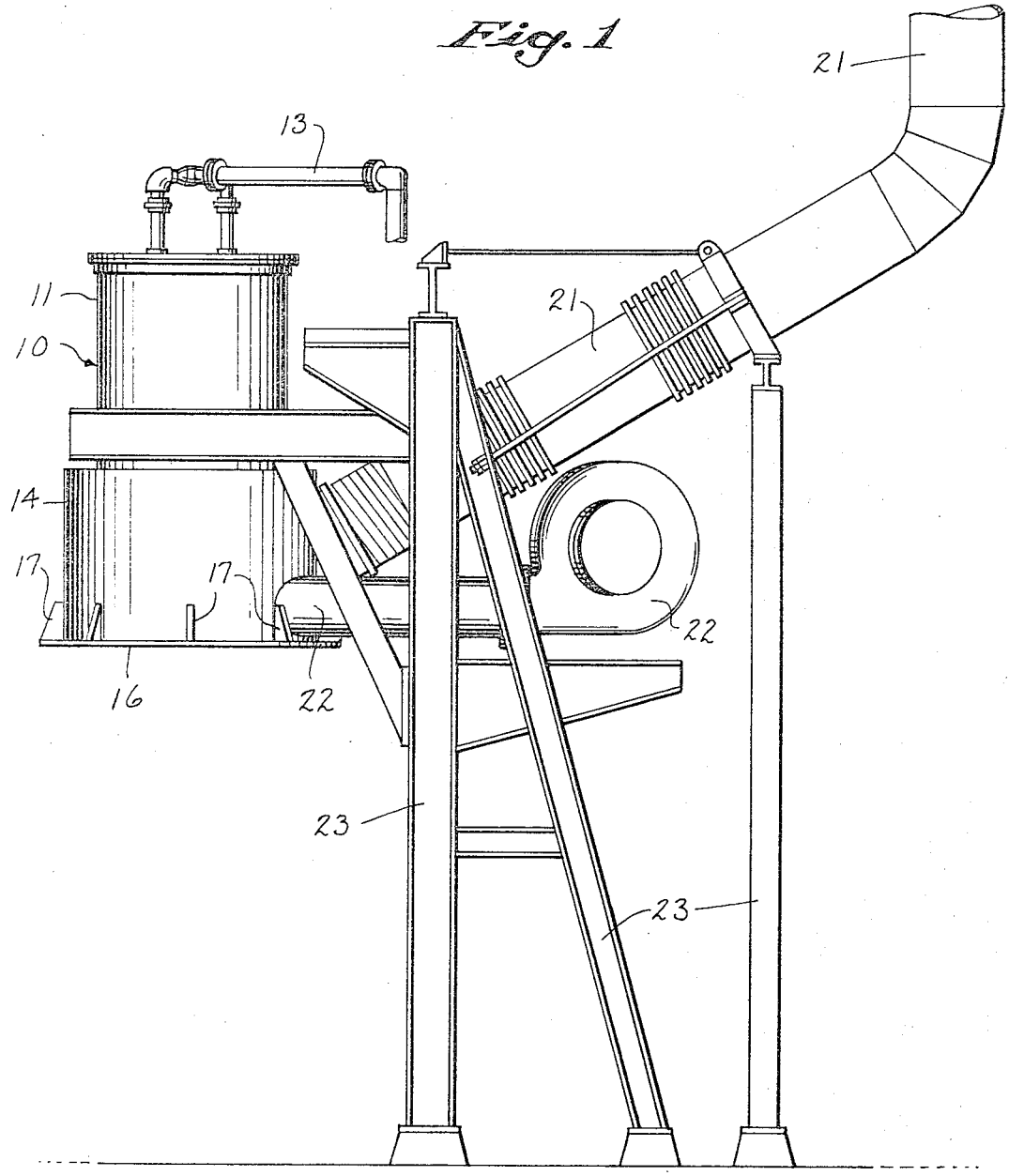
FIG. 1 is a side elevational view of the improved preheater apparatus without a scrap metal charge bucket associated therewith.

Referring now more particularly to the drawings, the numeral 10 designates generally the gas combustion unit featured in the present invention. Said combustion unit is preferably formed of stainless steel and includes an upper housing 11 having an outer wall and a concentric inner wall 15 defining an annular cavity or annulus 15'. Mounted at the top of said housing is a plurality of downwardly directed burners 12 connected to a gas supply pipe 13 leading from a suitable source of gas under pressure. Said burners 12 are designed and positioned to direct hot gases downwardly, in an evenly distributed pattern, into and through an enlarged, cylindrical combustion chamber 14, as indicated diagrammatically by the arrows in FIG. 2.

Figure 2:
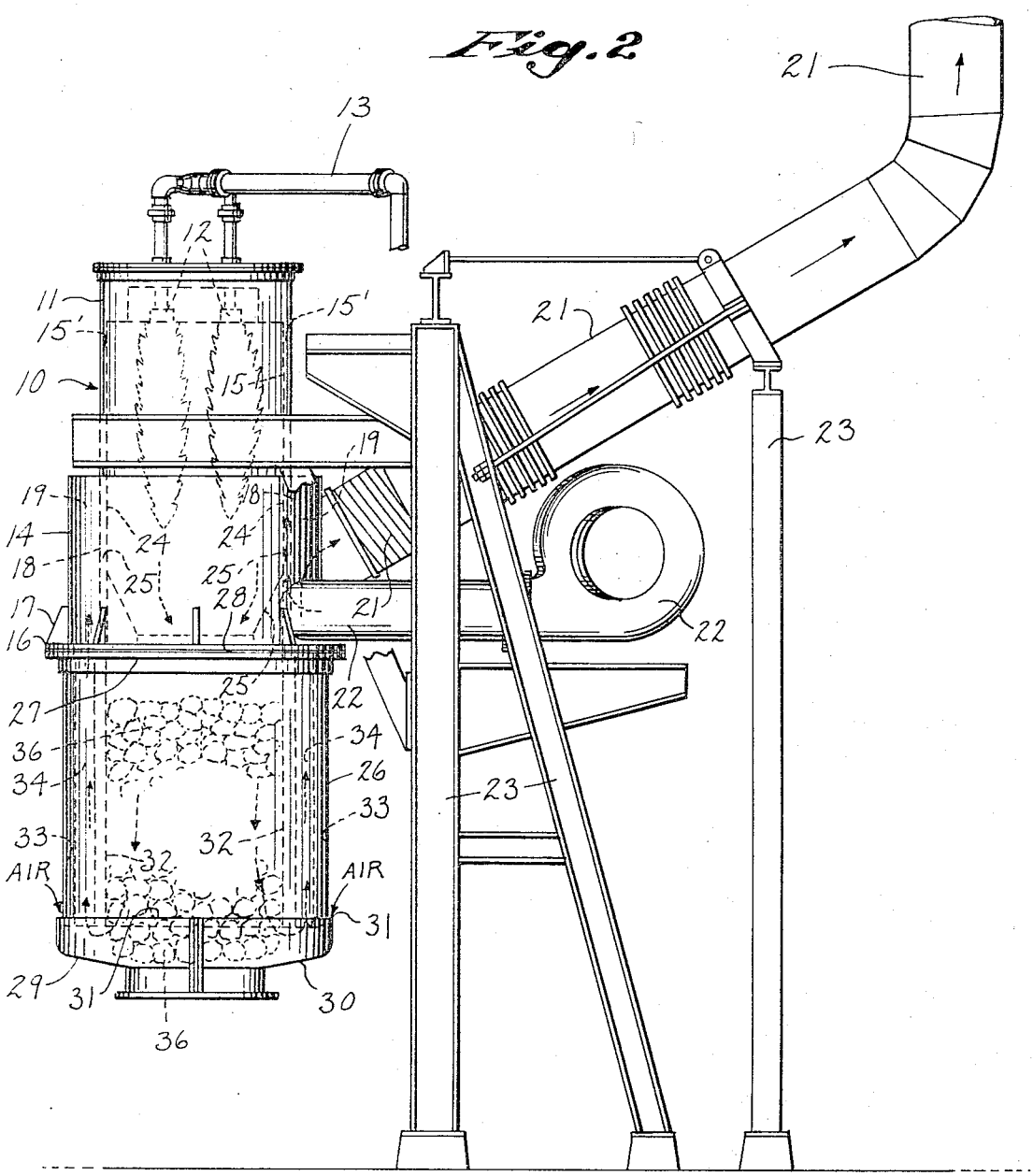
FIG. 2 is a side elevational view of the preheater with a charge bucket mounted on the underside thereof and indicating, diagrammatically, the flow path of the combustion gases.

The lower end of said combustion chamber 14 is open, and surrounding the bottom thereof is a peripheral, laterally projecting flange 16 reinforced by suitable external gussets 17. As shown in FIG. 2, a concentric wall 18 within said combustion chamber defines an annular cavity or annulus 19 which is open at the lower end of said chamber, and concentric with said wall 18 is an inner wall 24 defining another, smaller space or annulus 25 between said walls 18 and 24, said inner annulus being closed at its lower end but having an open top communicating with the annulus 15' in the housing thereabove.

A power-driven combustion air blower 22 is mounted adjacent the combustion unit and extends through the walls 14, 18 of the combustion chamber chamber to communicate with the innermost annulus 25 therein. Said blower unit supplies the necessary combustion air to the burners 12, as well as the necessary excess air for flame tempering of the gases, said air flowing upwardly through said annulus 25 into and through the communicating annulus 15' in the upper housing 11 to said burners. Unlike conventional preheaters, wherein the combustion air is introduced directly to the burners, in the present invention the introduction of said blower air through an annulus formed in the combustion chamber provides a continuous cooling of the inner wall of said chamber and eliminates the necessity for relatively expensive refractory lining, thereby substantially reducing the manufacturing cost of the unit. In addition, as said incoming blower air circulates around and upwardly through said inner combustion chamber annulus 25 it is preheated to provide hotter, more efficient firing of the burners.

Communicating with the combustion chamber outer annulus 19 and extending laterally outwardly and upwardly from the side of the combustion chamber is an exhaust duct 21, and mounted in association with said exhaust duct in a remote location, as for example on the roof of the foundry, there can be installed a venturi-type air ejector such as the ejector 40 shown in FIG. 5 of the drawings, or other suction creating means designed to draw the spent combustion gases through the exhaust system, as will be hereinafter described. Such an ejector is adjustable through the control valve 43 to create optimum required draft depending upon the particular preheating operation and density of the scrap metal charge. In addition, while a fan could be utilized for the same general purpose, an ejector such as the member 40 is not as susceptible to damage from high gas temperatures as the fan-type units utilized in conventional preheater systems, nor does it require the special controls which must be incorporated in such fans in order to compensate for the varying temperature and pressure conditions during the preheating cycles. In the event the exhausted gases create an air pollution problem the present unit can readily be associated with a gas cleaning apparatus such as the scrubber unit 42 illustrated in FIG. 6 merely by connecting the exhaust stack 21 thereto as shown, the design and operation of which scrubbers are known in the art.

Figure 3:
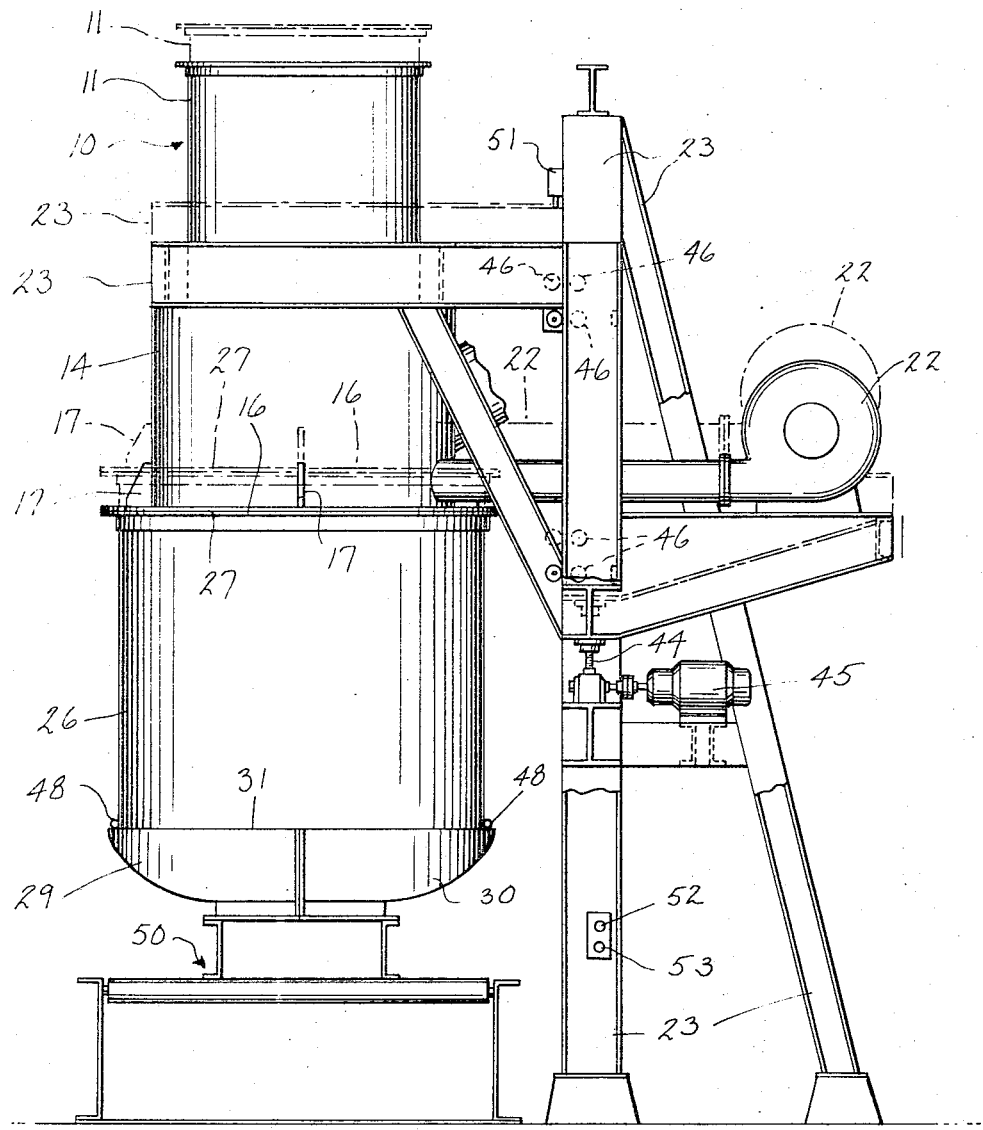
FIG. 3 is a partial side elevational view of the preheater and its supporting framework with said preheater unit being shown in full lines in its lowered position and illustrating, in broken lines, said unit in its raised position.

With reference to FIG. 3 of the drawings, steel frame elements 23 of suitable desired design support the combustion unit 10 and associated equipment, and through the action of a screw-type jack 44 operated by a motor 45 or other mechanism said combustion unit can be raised several inches, from the illustrated full line position to the elevated position shown in broken lines, the purpose of which will become apparent hereinafter. Preferably there are self-lubricating roller bearings 46 or the like to facilitate the vertical travel of said combustion unit within the frame 23.

Referring now more particularly to FIG. 2, the novel scrap metal charge bucket 26 featured in the present invention is shown engaged against the underside of the combustion unit 10. Said bucket is generally cylindrical in shape and includes an open top surrounded by a lateral flange 27 and having a resilient sealing gasket 28 which is designed to coact with the combustion chamber flange 16 to provide a leakproof seal when said bucket and combustion chamber units are pressurably coupled together. The lower end of said scrap bucket is provided with doors or gates 29, 30 which are hinged as at 48 (FIG. 3) and which can be swung from the illustrated closed position to an open position allowing the scrap metal charge 36 (FIG. 2) to be discharged from the bottom of said bucket when desired, there being suitable opening and latching means (not shown) associated with said doors, as is well-known in the art. A slight annular gap or clearance is provided between said bottom doors and the lower portion of the bucket, as indicated at 31, the purpose of which is to permit the entry of outside air into the bucket interior during the preheating operation, which is an important feature of the present invention as will be described.

With reference still to FIG. 2 of the drawings, mounted within the scrap bucket 26 is an interior wall element 32 which is concentric with and spaced from the outer wall of the bucket to provide an inner shell defining an annular space or cavity 33 within said bucket. Said annular space 33 opens in the upper end of the bucket and communicates with the combustion chamber gas annulus 19 when said members are coupled together, as illustrated. In the preferred embodiment of the invention a plurality of vertical, open ended stainless steel seamless tubes 34, hereinafter called riser tubes, are mounted in spaced relation within said bucket annular cavity, the spaces between said vertical tubes being packed with light density insulating material. The lower ends of said riser tubes are spaced somewhat above the bottom of the bucket so that combustion gases passing downwardly through the scrap 36 can enter and flow upwardly through said tubes, as indicated by the arrows and as will be more fully described hereinafter. Preferably said tubes 34 are welded or otherwise supported only at their upper ends, thereby allowing for downward linear expansion of said metal tubes when they become hot, there being a bottom plate or spider to guide and loosely retain said tubes during expansion or contraction.

In the operation of the new and improved preheater apparatus the combustion chamber 10 is raised to its elevated position through the actuation of the jack 44 and motor 45 (FIG. 3), or any other suitable actuating mechanism. The bucket 26 is filled with a cold scrap metal charge 36 (FIG. 2) and weighed at a remote location and is delivered to the combustion unit by a suitable power power-driven conveyor system, such as the conveyor unit 50 shown in FIG. 3.

The bucket 26 is indexed and positioned in alignment immediately below the combustion chamber 14, and in the illustrated form of the invention the combustion unit is then lowered into pressurable engagement against the top of said bucket, there being suitable limit switches such as the switch 51 (FIG. 3) to accurately control the vertical travel of said combustion unit. The annular flanges 16, 27 and gasket 28 cooperate to provide a tight seal between said combustion chamber and charge bucket, and the width of said lateral flanges 16, 27 is designed to compensate for slight misalignment between said members. It is to be understood, of course, that the bucket 26 is supported by the conveyor 50 or other suitable means while the combustion unit is pressurably engaged on the top thereof. Moreover, it is to be understood that while the pressure-type coupling and sealing method described has been found to perform satisfactorily, various types of clamps or other positive coupling devices could be used in lieu thereof and the particular means employed for separably joining said combustion chamber and bucket members is not a critical feature of the present invention. Further, within the intended scope of the invention it is possible to retain the combustion unit stationary if desired and to raise the bucket upwardly into engagement against the bottom thereof by an elevating device or other suitable means.

With the charge bucket 26 mounted on the underside of the combustion chamber 14, as described, the operator pushes a start button conveniently located adjacent the unit and connected to the electrical system to actuate the burners and commence the heating cycle, there preferably being low, medium and high burner settings which can be varied independently according to the process requirements as well as to the quality and density of the particular scrap. After the initial setting the unit is preferably designed to switch through all of the heating cycles automatically. In addition, in lieu of the described operator-initiated burner setting procedure, within the intended scope of the invention the entire firing sequence and rates can also be completely automatically programmed, as hereinafter described.

Figure 4:
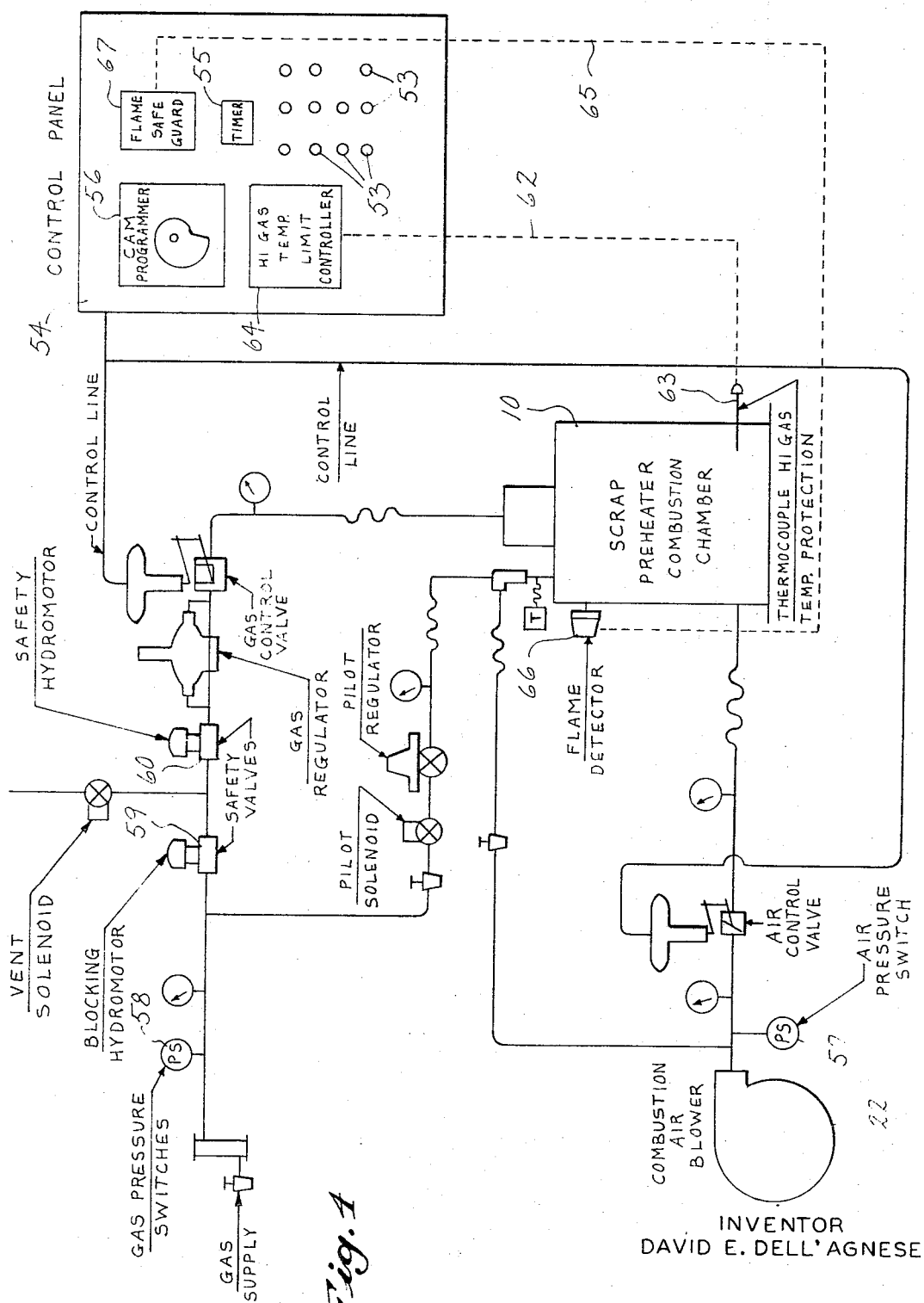
FIG. 4 is a diagrammatic view of the preheater operating system.

A diagram of the operating and control system is shown in FIG. 4 of the drawings. Buttons 53 on the control panel 54 can be manually actuated to shut off the burners any time the operator desires, or, alternatively, the timer 55 or cam programmer 56 can be set to automatically deactivate said burners after a predetermined time period. The illustrated programmer 56 can be utilized to set the burner firing rate, as well as permitting the automatic switching through any desired sequence of low, medium and high burner settings, as mentioned above, in addition to controlling the duration of each sequence. In lieu of said cam-type programmer a computer or other suitable control device could be employed. To provide safety means air and gas pressure switches 57, 58 and safety valves 59, 60 are provided and, in addition, a line 62 connects a thermal couple 63 in the combustion chamber 10 to a high gas temperature limit controller 64, and a line 65 connects a flame detector 66 in said combustion chamber to a flame safeguard 67 on the control panel. It is to be understood, of course, that the system diagrammed in FIG. 4 is merely illustrative of one preferred arrangement, and the invention is not to be limited or confined to a system exactly as shown, Moreover, the system can be either pneumatic or electric, or a combination thereof.

In the operation of the invention the remote air ejector 40 or a control valve 41 (FIG. 5) creates a suction within the riser tubes 34, and, as is shown by the diagrammatic arrows in FIG. 2, as the hot combustion gases descent through the charge 36 and reach the bottom portion of the bucket 26 they are drawn upwardly into said riser tubes. Simultaneously said suction creating means cause a quantity of relatively cool outside air to be drawn inwardly at a predetermined rate through the aforementioned annular gap 31 between the bucket doors 29, 30 and the lower end of the bucket. Said incoming air functions to cool the bucket doors 29, 30 to prevent said doors from warping or binding, and also mixes with the combustion gases to cool and temper gases before they circulate around the combustion chamber annulus 19 and are evacuated through the exhaust duct 21. Thus the combustion gases are cooled to a desired predetermined degree whereby they will not cause damage or deterioration to the preheater or exhaust system components, or to any gas cleaning equipment associated therewith, such as the scrubber 42 illustrated in FIG. 6. Because of the reduced temperature of said exhausted combustion gases, and the minimizing of damage to the preheater and exhaust equipment, with the present invention it is possible to preheat the scrap metal to a higher temperature than is practicable with prior gas-fired preheaters, thereby facilitating the job of the electric furnace and further reducing the cost of the melting operation.

The volume of outside air drawn into the system through the opening 31 is dependent upon the predetermined setting of the air ejector 40 (FIG. 5) or other suction creating means, such as the control valve 41, and said suction creating member is preferably adjustable to permit regulation of the air influx to correspond to the particular preheating operation as well as to the scrap density of the particular charge and other variable factors.

When the scrap charge within the bucket 26 has been preheated to the desired temperature the combustion unit 10 is raised and said bucket is withdrawn and transported to the electric melting furnace, where the bucket doors 29, 30 are opened to discharge the metal scrap 36 into said furnace.

Preferably, as hereinabove mentioned, the present apparatus is provided with variable stage burners that can be regulated according to the requirements of the particular melting operation, and, in addition, a low fire or idling setting is provided so that when the scrap charge in the bucket has been completely preheated the burners are either manually or automatically switched to low fire while the combustion unit is raised and the bucket removed and replaced. Means are also preferably provided in the system whereby the burners will automatically switch to low fire if the button is pushed to raise the jack 44 at any time during the heating cycle. This can be accomplished by means of the limit switch 51 (FIG. 3) which is tripped when the combustion chamber is elevated to its raised position and which is designed to either shut off the burner or set it in a low fire position. Moreover, in the preferred embodiment of the invention the operator can manually deactivate said burners in the event of an emergency, and in case of a failure anywhere in the system the burners will be automatically shut off, as hereinabove described.

When a preheating cycle is completed and the charge bucket has been picked up and its contents discharged into the electric melting furnace, the bucket can be refilled with a cold scrap charge, weighed, and returned to the preheater where the entire cycle is repeated. Alternatively, a plurality of buckets can be employed and suitable indexing and automatic mounting means utilized to ensure a new cold charge is always immediately available for preheating.

From the foregoing detailed description it will be seen that the present invention provides a novel compact gas-fired scrap metal preheater and scrap bucket assembly wherein the combustion gases are cooled to a degree whereby they won't damage or destroy the preheater components or the exhaust or gas cleaning equipment, whereby the necessity for a refractory lining such as is employed in conventional preheater combustion chambers is eliminated to reduce manufacturing costs, and whereby the scrap metal can be preheated to a higher degree than is possible with convention preheaters.

A further advantage of the new preheater apparatus is that the unique concept of directing the exhaust gases back up through registering annular passageways in the interconnected bucket and combustion chamber members provides a compact design which conserves valuable floor space. In addition, the present preheater is simple an and efficient in design and operation, and it is rugged and durable in construction.

It is to be understood that while a preferred embodiment of the present invention has been illustrated and described herein, numerous variations or modifications thereof will undoubtedly occur to those skilled in this art. What is intended to be covered herein, therefore, is not only the illustrated form of the invention buy also any and all modified forms thereof, as may come within the spirit of said invention and within the scope of the following claims.

I claim:

1. A scrap metal preheater assembly, comprising: an open bottom combustion chamber having an outer wall and having a first substantially concentric inner wall defining an open bottom exhaust gas annulus therebetween; gas burner means positioned to direct hot combustion gases downwardly through said combustion chamber; an exhaust duct communicating with said combustion chamber; and exhaust duct communicating with said exhaust gas annulus and extending outwardly from said combustion chamber; and open top scrap metal charge bucket positioned in alignment below said combustion chamber, said bucket having an outer wall and an inner wall defining an annular space therebetween having openings at its top and bottom ends, the upper end of said bucket annular space being adapted to register with said combustion chamber exhaust gas annulus when said combustion chamber is positioned on top of said bucket, and said bucket having an air intake opening in the lower portion thereof; means for removably sealingly coupling said combustion chamber and charge bucket members in vertically aligned relationship; and power-driven suction creating means adapted to cause hot combustion gases which pass downwardly through a scrap metal charge in the bucket during operation of the preheater to be drawn upwardly in said bucket annular space while outside air is simultaneously drawn into said space through said bucket air intake opening to mix with and cool said combustion gases as said gases are drawn upwardly into the communicating combustion chamber exhaust gas annulus and out through said exhaust duct.

2. The scrap metal preheater recited in claim 1 having a second inner wall within said combustion chamber spaced from and substantially concentric with said first inner wall and defining an inner, combustion air annulus therebetween communicating with said gas burner means; and having a power-driven combustion blower communicating with said combustion air annulus, said blower directing cooling air around and upwardly through said inner annulus to the burners for use in firing said burners.

3. The scrap metal preheater recited in claim 1 having a plurality of vertical, open ended riser tubes mounted in spaced relation within said bucket annular space, an having ceramic material packed between said tubes whereby said combustion gases and cooling air will be directed into and upwardly through said riser tubes.

4. The scrap metal preheater recited in claim 3 wherein said riser tubes are formed of metal and are supported at their upper ends with their lower ends loose to permit linear expansion of said tubes when they become hot.

5. The scrap metal preheater recited in claim 1 and wherein said combustion chamber is vertically movable to permit the separable pressurable engagement of the same on the top of said charge bucket.

6. The scrap metal preheater recited in claim 5 and including power-driven means for raising and lowering said combustion chamber into and out of pressurable engagement with said bucket.

7. The scrap metal preheater recited in claim 1 wherein said burners are provided with independently adjustable low, medium, and high settings.

8. The scrap metal preheater recited in claim 7 and including means for automatically switching said burners through said variable settings in desired sequence and for desired durations during the preheating cycle.

9. The scrap metal preheater recited in claim 8 and including programming means for automatically setting and activating said gas burner means in accordance with predetermined requirements.

10. The scrap metal preheater recited in claim 7 and including means automatically switching said burners to low when said combustion chamber and bucket members are separated.

11. The scrap metal preheater recited in claim 1 and including means for deactivating said burners during the preheating operation if desired.

12. The scrap metal preheater recited in claim 1 and including means automatically deactivating said burners in the event of an operational failure in the apparatus.

13. The scrap metal preheater recited in claim 1 wherein said combustion chamber outer and inner walls are formed of metal and said chamber is entirely devoid of refractory lining.

14. The scrap metal preheater recited in claim 1 wherein said suction creating means includes a venturi-type air ejector associated with said exhaust duct.

15. The scrap metal preheater recited in claim 1 wherein said suction creating means can be adjusted as desired, depending upon the particular preheating operation and density of the scrap metal charge.

16. The scrap metal preheater recited in claim 1 wherein said bucket is provided with hingedly attached bottom doors.

17. The scrap metal preheater recited in claim 16 wherein said air intake opening is formed between said bottom doors and said bucket.

18. The scrap metal preheater recited in claim 1 wherein said combustion chamber and bucket members are provided with annular flanges and gasket means which coact to provide a leakproof seal therebetween when said members are coupled together, said flanges extending laterally to compensate for inadvertent misalignment of said members.

19. The scrap metal preheater recited in claim 1 and including gas cleaning means associated with said exhaust duct.